L. POLTRONIERI.
SAFETY MILK BOTTLE HOLDER.
APPLICATION FILED APR. 3, 1917.
1,237,217.
Patented Aug. 14, 1917.
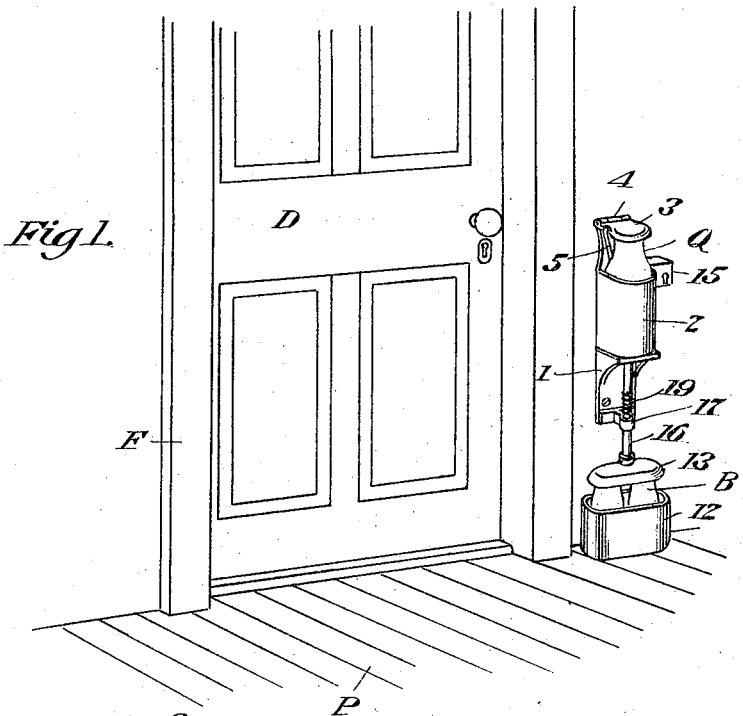
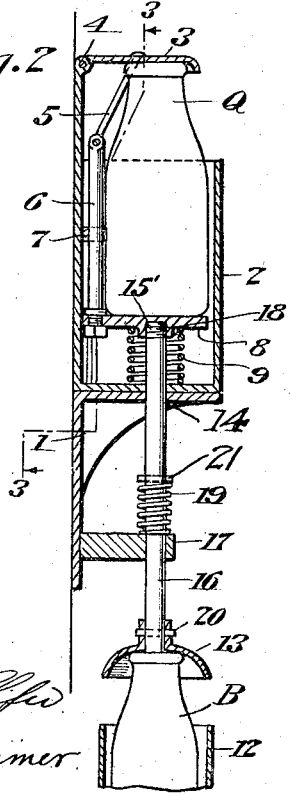
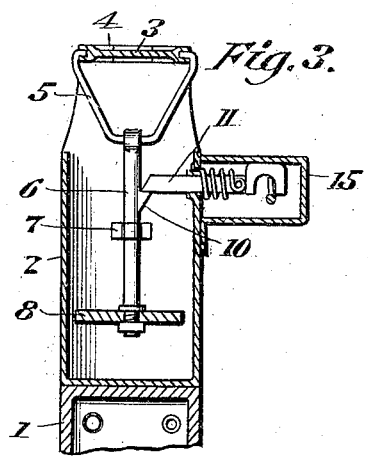
INVENTOR
Louis Poltronieri
BY Victor J. Evans
ATTORNEY
WITNESSES

UNITED STATES PATENT OFFICE.

LOUIS POLTRONIERI, OF BROOKLYN, NEW YORK.

SAFETY MILK-BOTTLE HOLDER.

1,237,217.      Specification of Letters Patent.      Patented Aug. 14, 1917.

Application filed April 3, 1917. Serial No. 159,592.

*To all whom it may concern:*

Be it known that I, LOUIS POLTRONIERI, a citizen of the United States of America, residing at Brooklyn, in the county of Kings and State of New York, have invented new and useful Improvements in Safety Milk-Bottle Holders, of which the following is a specification.

This invention relates to deposit and collection receptacles, and more especially to those intended to receive the milk bottle; and the objects of the same are to produce a milk bottle holder which will not be locked by the insertion of an empty bottle but will be when this bottle is exchanged for one that is full, and to produce an attachment which may be added so that the capacity of the device may be considerably amplified without necessitating any change in or addition to the locking mechanism. This improved milk bottle holder is such as is usually put up alongside a door, such as the kitchen door which opens onto the back porch, or in some places it may be put up on a post alongside the front gate, and the milkman making his early-morning rounds is supposed to remove yesterday's milk bottle which is now empty and clean and replace it with today's milk bottle containing the fresh supply. Occasions arise where the housewife wants an additional supply on a certain day, and the general practice is to leave a note in the old milk bottle asking that the delivery for that day be increased. It is well known that malicious persons often help themselves to the milk when so left, or perhaps a stray dog or cat may be attracted to the milk and in its efforts to get the lid off the bottle will tip it over on the porch. Always there are flies and other insects, and it is well known that in the time between the delivery of the milk and its acceptance by the housewife, it is exposed to whatever may befall. Provision has therefore been made by means of milk bottle holders, and one class of these devices is locked by the closing of the door while another class has a lock of its own. My invention belongs to the last-named class, but it contains special means for adapting it to those occasions when an extra supply of milk is desired. Details will be found in the following specification, reference being had to the accompanying drawings wherein:—

Figure 1 is a general perspective view of this device attached to the door frame, and showing the use of the attachment by which its capacity may be increased. This view shows a door opening onto a porch, and the extra bottles placed on the floor of the porch, whereas parts of the main receptacle are broken away to show the daily bottle and the means by which it is protected.

Fig. 2 is an enlarged sectional view through the device and the attachment for amplifying its capacity.

Fig. 3 is a section on the line 3—3 of Fig. 2.

In the drawings let P designate the porch floor and D the back door. Attached to its frame F are brackets 1 supporting a cup-shaped casing 2 of appropriate size to receive say a quart bottle of milk indicated by Q if that is to be the daily supply. The neck of this bottle rises above the casing, and a cover 3 hinged at 4 to a board rising from the back of the casing is adapted to move downward over the mouth of the bottle when the latter is disposed within the casing, and when so closed downward to prevent the removal of the bottle or access to its mouth at all. Connected with the edges of this cover are the arms of a bail 5 which converge and are attached to a plunger 6 slidably mounted in guide 7 within the casing and having a foot or platform 8 projecting forward from its stem and on which the bottle Q rests. This platform is normally sustained by a spring 9 whose tension must be carefully adjusted to the weight of the daily supply, which in the present case is a quart bottle of milk. That is to say, the expansive force of the spring is such as to raise the plunger and the bottle when the latter is empty, and by means of the bail 5 this elevates the cover 3. But the spring should have such tension or its tension should be so adjusted that it will compress when the empty bottle is replaced by a full one, or in other words the added weight of the milk will overcome the force of the spring. When it compresses, the plunger 6 moves downward and the bail closes the cover over the mouth of the bottle in a manner which will be clear.

At a proper point on the plunger is a tooth 10 beveled on its under side. The numeral 11 designates a bolt mounted in suitable guides and pressed toward said plunger by a spring, and the tip of this bolt is beveled to coact with the bevel of the tooth 10. The result is that when the latter descends it passes the beveled tip of the bolt and pushes the same outward against the force of the spring, but after the tooth has passed the bolt the latter is projected by the spring and therefore the plunger is locked in its depressed position and the cover 3 is locked closed on the neck of the bottle Q. This bolt forms part of a lock broadly indicated by the numeral 15, and in the present case the lock is carried by the casing 2 and is of that type which may be opened by means of a key. The key is of course in the possession of the housewife. While the bolt and its spring are exposed in Fig. 1 for purposes of illustration, they will of course be out of sight and out of reach. Now when the housewife puts an empty bottle Q into the casing and onto the platform 8, the spring 9 is not compressed. In the morning when the milkman takes out this empty bottle and replaces it with a filled one, the increase in weight overcomes the spring and the platform moves downward. This slides the plunger 6 downward through its guide 7, and through the bail 5 the cover is closed onto the neck of the bottle which is therefore protected. Meanwhile the tooth 10 is engaged by the bolt 11 of the lock, and therefore the cover can not be again raised to remove the bottle until the housewife comes with the key and opens the lock. It may well be assumed that the bottle holder can be made in sizes, one adapted to receive a pint bottle of milk and with a spring of appropriate strength, and another to receive a quart bottle of milk and with a little stronger spring; although the details and sizes may be left to the manufacturer, and the user will purchase such as is desired.

Coming now to the second feature of my invention which permits the housewife at times to order an increased supply of milk, furnished in additional bottles, and yet to protect all of them against malicious trespass and theft or against interference by cats and dogs, etc., I propose to make use of the same attachment and the same lock, with slight additions. Mounted on and preferably secured to the porch floor P directly beneath the device above described is a second cup-shaped casing 12 over which moves an inverted cup-shaped cover 13, the latter carried by a plunger 16 movable through a guide 17 as seen, and this plunger and cover are normally raised by a spring 19 which may well inclose the plunger and rest upon the guide, its upper end engaging a pin 21 as seen. The plunger extends upward through a hole 14 in the bottom of the casing 2 and is detachably connected at its upper end in any appropriate manner with the mechanism above described. As here shown I have illustrated its upper end as threaded as at 15' to engage a threaded socket 18 formed in the platform 8, and therefore when the plunger is raised its threaded end may be screwed into said socket by rotating the plunger within its guides. The casing 12 and cover 13 may be of sheet metal, and the parts should be so proportioned that when the platform 8 rises to raise the main cover 3 and expose the device for the daily use, the cover 13 will rise off the casing 12 to expose the lower receptacle for extraordinary use. Now when the housewife desires an extra supply of milk, she puts some extra bottles within the lower casing and a note in the bottle in the upper casing. The milkman finds this note and fills the order. He puts the usual bottle Q into the upper casing as above described and the additional bottle B into the lower casing, and the weight of the upper bottle depresses the platform, while the downwardly moving platform depresses the plunger 16 and closes the cover 13 over the casing 12, thereby protecting the bottles B as well as the single bottle Q. At other times the plunger 16 is disconnected from the socket 18 in the platform 8 and out of use, and yet it is not much in the way. In fact the device may be sold with or without this attachment, according as the housewife desires. If purchased with the attachment, the latter may be put into use only when it is necessary, and for this purpose the lower end of the plunger 16 may be detachably connected with the cover 13 as by a cross pin 20. When this pin is withdrawn the cover comes off and the plunger may be entirely removed from its guides 17 and taken into the house, the other pin 21 and the spring 19 being of course carried with it. I have said the casing 12 is attached to the porch, but it may not be necessary to attach it as it is sufficient if it rests thereon, because when the cover 13 comes down over it the casing and the bottles therein are prevented from removal or interference. Thus the attachment amplifies the capacity of the device according to the capacity of the attachment. The main device may be adapted for a quart bottle or for a pint bottle, and the attachment for several additional bottles. The attachment itself could be made in sizes, as when used by a boarding house or a small-sized hotel. The parts are all of the desired materials and proportions, and I have not gone into working details, as they may be left to the manufacturer.

What is claimed as new is:—

1. In a milk bottle holder of the type described, the combination with a main casing having a movable cover, a plunger connected with the cover, a platform on the plunger, and a spring adapted to support said platform, plunger, and cover and the weight of an empty bottle but to compress under the weight of a filled bottle; of means for locking said plunger in its depressed condition, a subjacent casing for other bottles, a cover therefor, and connections between the last named cover and the platform, for the purpose set forth.

2. In a milk bottle holder of the type described, the combination with a main casing having a movable cover, a plunger connected with the cover, a platform on the plunger, a spring adapted to support said platform, plunger, and cover and the weight of an empty bottle but to compress under the weight of a filled bottle, and means for locking said plunger in its depressed condition; of a subjacent casing capable of containing additional bottles, an inverted cup-shaped cover for this casing, a plunger rising from the last-named cover through suitable guides, means for detachably connecting the plunger with said platform, and a spring of sufficient force to sustain the weight of this plunger and its cover, for the purpose set forth.

3. The combination with a casing having a hole in its bottom, a cover for the casing, a vertically movable platform in such casing depressed by the weight of the filled bottle constituting the daily supply, and means for locking the platform in depressed condition and the cover closed to protect said daily supply; of a subjacent casing capable of containing bottles of milk constituting an extra supply, a cover coacting with this casing, a plunger rising from the cover through the hole in said casing, means for detachably connecting it with said platform at will, and yielding means for supporting the weight of the plunger and cover, for the purpose set forth.

4. The combination with a milk bottle holder including a casing having a hole in its bottom, a vertically movable platform therein depressed by the weight of the filled bottle constituting the daily supply and having a threaded socket above said hole, and means for locking the platform in depressed condition and protecting said daily supply; of a subjacent casing capable of containing bottles of milk constituting an extra supply, an inverted cup-shaped cover coacting with this casing, a plunger rising from the cover through the hole in said casing and threaded at its upper end for detachable engagement with said socket, and yielding means for supporting the weight of this plunger and cover, for the purpose set forth.

In testimony whereof I affix my signature.

LOUIS POLTRONIERI.

Copies of this patent may be obtained for five cents each, by addressing the "Commissioner of Patents, Washington, D. C."